March 24, 1964 P. GLOOR 3,126,336
DOMESTIC JUICE CENTRIFUGES
Filed Sept. 6, 1960 ns
3,126,336
DOMESTIC JUICE CENTRIFUGES
Paul Gloor, Olten, Switzerland, assignor to Rotel A.G., Aarburg, Switzerland, a Swiss corporation
Filed Sept. 6, 1960, Ser. No. 54,190
3 Claims. (Cl. 210—369)

The invention relates to improvements in domestic juice centrifuges, preferably those from which the juice automatically discharges during operation.

The spinning of the screening basket of such a centrifuge which may comprise an abrasive disc and an inlet passage for the object or material from which the juice is to be extracted causes a strong radially directed air stream through the perforate screening wall of the basket. This air stream facilitates the separation of the juice, but with centrifuges from which the juice automatically discharges the air currents and eddies set up are disadvantageous and the distribution of the husks or other residue is detrimentally affected. It has been found that certain advantages can be gained by a controlled escape of the air stream separated from the juice and in accordance with the invention, this is achieved by providing a jacketed housing for the juice-receiving chamber around the basket and at least one opening connecting the space between the housing walls and the juice-receiving chamber and at least one restricted outlet from the said space to the exterior arranged so as to prevent juice from passing therethrough with the air.

The accompanying drawing shows one embodiment of the invention by way of example.

Figure 1:
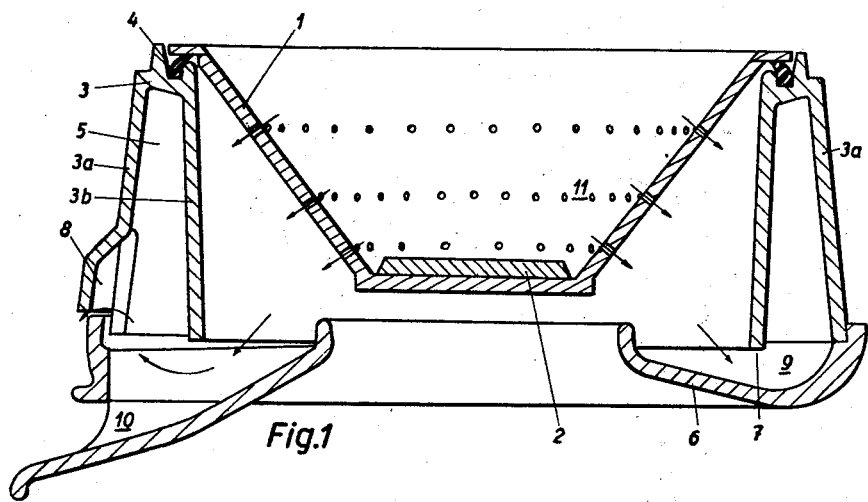
FIG. 1 is a section through the juice centrifuge, without cover.
Figure 2:
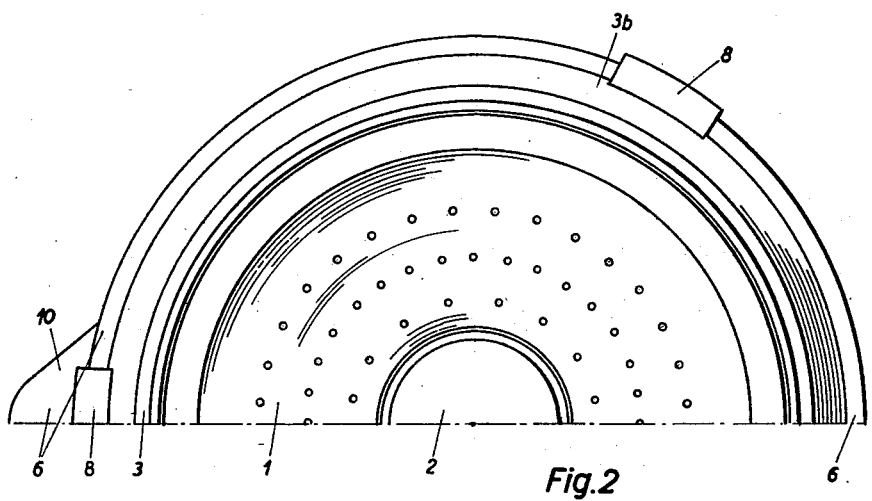
FIG. 2 is a plan view.

The basket 1 of the centrifuge, which basket provides the perforate screening wall, is internally provided with an abrasive disc 2 and its upper flanged rim is supported by the wall of the housing 3 which is provided with a rubber ring 4 for seating the rim of the said wall. The housing is a jacketed housing, i.e., is double walled, providing a space 5. The housing 3 rests on the juice pan 6 in such a way that its inner wall 3b leaves an annular slot aperture 7 over the pan permitting passage of the juice whilst the outer wall 3a circumferentially closes the rim of the pan save for a few restricted apertures 8 distributed around the rim arranged so that juice will not pass through them with the air during operation of the centrifuge.

When the basket 1 of the centrifuge is rotated, the resulting centrifugal forces create a radially directed airstream through the perforated wall of the basket as indicated by the arrows. The juice passes through the said wall and is collected in the pan 6. Around the space 9 pressure is created equalised by the conditions in the jacket space allowing the air but not the juice to pass out through the apertures 8. Consequently, little air appears at the spout 10 and undesirable back pressure through the screening wall of the basket into the space 11 thereof is obviated.

The apertures 8 may alternatively be holes in the outer jacket wall. The inner wall may also be provided with holes provided they are not in alignment with those in the outer wall as this would cause the juice to be undesirably ejected.

What I claim is:

1. Domestic centrifuge for extracting juice, comprising a rotatable basket having a perforate screening wall, a double-walled stationary housing supporting said basket and having an inner and outer wall joined at their upper portions and defining between said walls a downwardly open annular air space extending around the entire periphery of said basket, a juice receiving pan having a bottom below and spaced from said inner wall, said pan forming a juice collecting chamber communicating with said downwardly open annular air space, said outer housing wall being supported on said juice pan, and means forming at least one restricted outlet in said outer housing wall above said juice pan for passage of air by centrifugal force outwardly, whereby extracted juice passing through said basket screening wall collects free of entrained air in said pan.

2. Domestic centrifuge according to claim 1, further comprising a spout on said juice pan through which the juice discharges during rotation of the screening basket, the inner wall of said housing leaving an annular slot thereunder providing the means of communication between the said chamber and the said space between the housing walls over the juice pan, and a plurality of restricted openings being provided in said outer housing wall in spaced relation around the housing forming said restricted air outlet.

3. Domestic centrifuge for extracting juice, comprising a rotatable basket having a perforate screening wall, a double-walled stationary housing supporting said basket and having an inner and outer wall joined at their upper portion and defining between said walls a downwardly open annular air space extending around the entire periphery of said basket, a juice receiving pan having a bottom below and spaced from said inner wall, said pan forming a juice collecting chamber coextensively communicating with said downwardly open annular air space, said outer housing wall being supported on said juice pan, and means forming at least one restricted outlet in said outer housing wall above said juice pan for passage of air by centrifugal force outwardly, whereby extracted juice passing through said basket screening wall collects free of entrained air in said pan.

References Cited in the file of this patent

UNITED STATES PATENTS

| 2,180,877 | Lorenzen | Nov. 21, 1939 |
| 2,343,327 | Reynolds | Mar. 7, 1944 |

FOREIGN PATENTS

| 121,130 | Great Britain | June 5, 1919 |